(12) United States Patent
Chen

(10) Patent No.: US 9,591,650 B2
(45) Date of Patent: Mar. 7, 2017

(54) COMMUNICATION METHOD AND APPARATUS, AND RECEIVING METHOD AND APPARATUS IN WIRELESS LOCAL AREA NETWORK

(71) Applicant: Huawei Technologies Co., Ltd., Shenzhen (CN)

(72) Inventor: Xiaofeng Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 14/550,687

(22) Filed: Nov. 21, 2014

(65) Prior Publication Data

US 2015/0078354 A1    Mar. 19, 2015

Related U.S. Application Data

(63) Continuation of application No. PCT/CN2013/071079, filed on Jan. 29, 2013.

(30) Foreign Application Priority Data

May 23, 2012  (CN) .......................... 2012 1 0162212
May 23, 2012  (CN) .......................... 2012 1 0422743
Nov. 13, 2012  (CN) .......................... 2012 1 0453764

(51) Int. Cl.
*H04W 72/04* (2009.01)
*H04W 40/24* (2009.01)
(Continued)

(52) U.S. Cl.
CPC ......... *H04W 72/0486* (2013.01); *H04L 5/001* (2013.01); *H04L 5/0044* (2013.01);
(Continued)

(58) Field of Classification Search
None
See application file for complete search history.

(56) References Cited

U.S. PATENT DOCUMENTS

2006/0050742 A1*  3/2006  Grandhi ............ H04W 74/0816
                                                          370/506
2008/0151849 A1    6/2008  Utsunomiya et al.
(Continued)

FOREIGN PATENT DOCUMENTS

CN    101212380 A    7/2008
CN    101547527 A    9/2009
(Continued)

OTHER PUBLICATIONS

"Aruba Airmesh MSR1200 Indoor Wireless Mesh Router," MSR1200 Data Sheet, Aruba Networks, Sunnyvale, California (2011).
(Continued)

*Primary Examiner* — Kodzovi Acolatse
(74) *Attorney, Agent, or Firm* — Leydig, Voit & Mayer, Ltd.

(57) ABSTRACT

Embodiments of the present invention disclose a communication method, a receiving method and an apparatus in a wireless local area network. The communication method includes: determining a first channel and a second channel of the wireless local area network, where the first channel and the second channel are consecutive, and the wireless local area network includes a first local area network and a second local area network; sending a first beacon frame by using all or a part of a bandwidth of the first channel, where the first beacon frame includes system information of the first local area network; and sending a second beacon frame by using all or a part of a bandwidth of the second channel, where the second beacon frame includes system information of the second local area network. The embodiments of the present invention improve a utilization rate of system spectrum resources.

19 Claims, 10 Drawing Sheets

(51) Int. Cl.
  *H04L 5/00* (2006.01)
  *H04L 27/26* (2006.01)
  *H04W 16/14* (2009.01)
  *H04W 84/12* (2009.01)
  *H04W 48/12* (2009.01)

(52) U.S. Cl.
  CPC .......... *H04L 5/0053* (2013.01); *H04L 5/0073* (2013.01); *H04L 27/2602* (2013.01); *H04L 27/2646* (2013.01); *H04W 16/14* (2013.01); *H04W 40/244* (2013.01); *H04L 27/2613* (2013.01); *H04L 27/2656* (2013.01); *H04W 48/12* (2013.01); *H04W 84/12* (2013.01)

(56) References Cited

U.S. PATENT DOCUMENTS

| | | | |
|---|---|---|---|
| 2009/0016456 A1 | 1/2009 | Li et al. | |
| 2009/0247094 A1 | 10/2009 | Sakoda | |
| 2009/0285116 A1* | 11/2009 | Nanda | H04W 72/02 370/252 |
| 2009/0323608 A1* | 12/2009 | Adachi | H04W 48/18 370/329 |
| 2011/0255401 A1 | 10/2011 | Seok | |
| 2013/0272288 A1* | 10/2013 | Li | H04L 5/0053 370/338 |
| 2014/0036835 A1 | 2/2014 | Trainin et al. | |

FOREIGN PATENT DOCUMENTS

| | | |
|---|---|---|
| CN | 102264155 A | 11/2011 |
| CN | 102265668 A | 11/2011 |
| WO | WO 2011105852 A2 | 9/2011 |
| WO | WO 2012026779 A2 | 3/2012 |
| WO | WO 2012030677 A2 | 3/2012 |

OTHER PUBLICATIONS

Xhafa et al., "On the Coexistence of Overlapping BSSs in WLANs," Vehicular Technology Conference, Institute of Electrical and Electronics Engineers, New York, New York (2007).

* cited by examiner

COMMUNICATION METHOD AND APPARATUS, AND RECEIVING METHOD AND APPARATUS IN WIRELESS LOCAL AREA NETWORK

CROSS-REFERENCE TO RELATED APPLICATIONS

This application is a continuation of International Patent Application No. PCT/CN2013/071079, filed on Jan. 29, 2013, which claims priority to Chinese Patent Application No. 201210162212.0, filed on May 23, 2012, Chinese Patent Application No. 201210422743.9, filed on May 23, 2012, Chinese Patent Application No. 201210453764.7, filed on Nov. 13, 2012, all of which are hereby incorporated by reference in their entireties.

TECHNICAL FIELD

The present invention relates to the field of wireless communications technologies, and in particular, to a communication method, a receiving method and an apparatus in a wireless local area network.

BACKGROUND

Generally, wireless local area networks (WLAN) use the IEEE 802.11 Protocol. A wireless local area network is generally includes one access point (Access Point, AP) and at least one station (Station, STA). The IEEE 802.11 Protocol includes many protocol branches, such as 802.11a, 802.11b, 802.11g and 802.11n, and different protocol branches have different application scenarios or service application types. For example, bandwidths for data transmission are different: 802.11n can support a bandwidth of 40 MHz, and each of 802.11a, 802.11b and 802.11g can support a bandwidth of 20 MHz; operating frequency bands are different, the numbers of antennas that can be supported for transmission are different, supported modulation and coding modes are different, and the like.

When an 11n system is designed, backward compatibility is considered. That is, STAs that support 802.11a, 802.11b and 802.11g can still be connected to an 11n system (that is, an 11n local area network) for communication as if they were connected to their respective systems, that is, the STAs that support 802.11a, 802.11b and 802.11g do not know that they are actually connected to an 802.11n system. However, when the STAs that support 802.11a, 802.11b and 802.11g communicate, by using the 802.11n system, with an AP that supports 802.11n, features of 802.11n cannot be used. This is because the bandwidth supported by 802.11n is 40 MHz, and the bandwidth supported by 802.11a, 802.11b and 802.11g is 20 MHz; and when communicating, by using the 802.11n system, with the AP that supports 802.11n, the STAs that support 802.11a, 802.11b and 802.11g occupy only 20 MHz of the 40 MHz for communication, and the other 20 MHz of the bandwidth is wasted consequently.

In a process of studying and practicing the prior art, the inventor of the present invention finds that during communication, by using the 802.11n system, with the AP that supports 802.11n, the STAs that support 802.11a, 802.11b and 802.11g occupy only 20 MHz of the 40 MHz for communication, and the other 20 MHz of the bandwidth is wasted consequently, which reduces a network throughput, and further reduces a utilization rate of spectrum resources.

SUMMARY

Embodiments of the present invention provide a communication method, a receiving method and an apparatus in a wireless local area network, so as to solve a technical problem of a low utilization rate of system spectrum resources in the prior art.

To solve the foregoing technical problem, an embodiment of the present invention provides a communication method in a wireless local area network, where the method includes:

determining a first channel and a second channel of the wireless local area network WLAN, where the first channel and the second channel are consecutive, and the wireless local area network includes a first local area network and a second local area network;

sending a first beacon frame by using all or a part of a bandwidth of the first channel, where the first beacon frame includes system information of the first local area network; and sending a second beacon frame by using all or a part of a bandwidth of the second channel, where the second beacon frame includes system information of the second local area network.

An embodiment of the present invention further provides a communications apparatus in a wireless local area network, including:

a determining unit, configured to determine a first channel and a second channel of the wireless local area network WLAN, where the first channel and the second channel are consecutive, and the wireless local area network includes a first local area network and a second local area network;

a first sending unit, configured to send a first beacon frame by using all or a part of a bandwidth of the first channel, where the first beacon frame includes system information of the first local area network; and a second sending unit, configured to send a second beacon frame by using all or a part of a bandwidth of the second channel, where the second beacon frame includes system information of the second local area network.

An embodiment of the present invention further provides a data receiving method, where the method includes:

receiving a first access request that is sent by a station in a first local area network by using a first channel after a first beacon frame is detected, and receiving a second access request that is sent by a station in a second local area network by using a second channel after a second beacon frame is detected, where the first channel and the second channel are consecutive channels of a wireless local area network WLAN, and the wireless local area network includes the first local area network and the second local area network;

sending a first access response to the station in the first local area network by using the first channel, and sending a second access response to the station in the second local area network by using the second channel; and receiving, by using the first channel, data that is sent by the station in the first local area network, and receiving, by using the second channel, data that is sent by the station in the second local area network.

An embodiment of the present invention further provides a data receiving apparatus, including:

a first receiving unit, configured to receive a first access request that is sent by a station in a first local area network by using a first channel after a first beacon frame is detected, and receive a second access request that is sent by a station in a second local area network by using a second channel after a second beacon frame is detected, where the first channel and the second channel are consecutive channels of a wireless local area network, and the wireless local area network includes the first local area network and the second local area network;

a sending unit, configured to send a first access response to the station in the first local area network by using the first channel, and send a second access response to the station in the second local area network by using the second channel; and a second receiving unit, configured to receive, by using the first channel, data that is sent by the station in the first local area network, and receive, by using the second channel, data that is sent by the station in the second local area network.

As can be learned from the foregoing disclosed technical solutions, in the embodiments of the present invention, an access point transmits different beacon frames by using different channels to set up different WLANs, so that protocol stations STAs (for example, an 802.11n STA, an 802.11a STA, an 802.11b STA, and an 802.11g STA) that support different bandwidths can be connected to the same access point by using the different WLANs, thereby solving the problem of a low utilization rate of system spectrum resources in the prior art, which arises because different protocol stations STAs are connected to an access point by using a same channel. In other words, in the embodiments of the present invention, an AP can send different beacon frames to stations in different local area networks by using different channels, so that the stations are connected to the AP by using corresponding channels (local area networks) and communicate by using the corresponding channels, thereby improving the utilization rate of the system spectrum resources.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention. In the embodiments of the present invention, a first local area network is a first wireless local area network, and a second local area network is a second wireless local area network.

Figure 1:
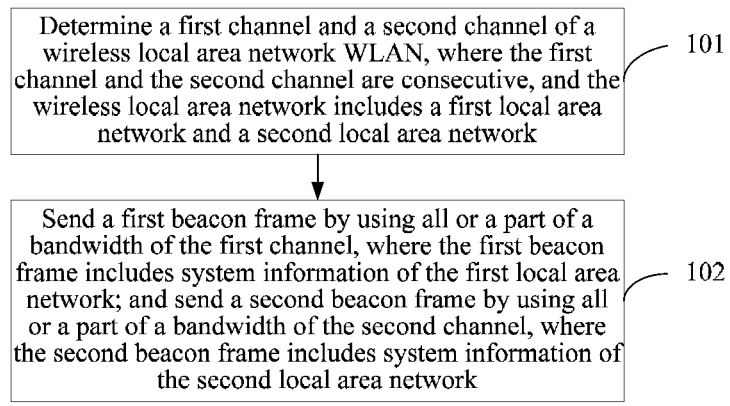
FIG. 1 is a flowchart of a communication method in a wireless local area network according to an embodiment of the present invention.

Referring to FIG. 1, FIG. 1 is a flowchart of a method for sending a beacon frame according to an embodiment of the present invention. The method includes:

Step 101: Determine a first channel and a second channel of a wireless local area network, where the first channel and the second channel are consecutive, and the wireless local area network includes a first local area network and a second local area network.

In this step, a determining manner is that: an access point (AP, Access point) selects a channel bandwidth that needs to be used by the wireless local area network (WLAN); and divides the channel bandwidth into a first channel bandwidth and a second channel bandwidth, where the first channel bandwidth and the second channel bandwidth are consecutive in frequency. In other words, start and end frequencies are determined for the channel bandwidth that needs to be used by the wireless local area network (WLAN), and the channel bandwidth is divided into the first channel bandwidth and the second channel bandwidth according to the start and end frequencies, where the first channel bandwidth is the first channel of the wireless local area network, and the second channel bandwidth is the second channel of the wireless local area network. Assuming that the selected channel bandwidth that needs to be used by the wireless local area network (WLAN) is 40 MHz, and covers a frequency range from 2422 MHz to 2462 MHz, the first channel may be 2422 MHz to 2442 MHz, and the second channel may be 2442 MHz to 2462 MHz.

Step 102: Send a first beacon frame by using all or a part of a bandwidth of the first channel, where the first beacon frame includes system information of the first local area network; and send a second beacon frame by using all or a part of a bandwidth of the second channel, where the second beacon frame includes system information of the second local area network.

A local area network corresponding to an 802.11 series protocol corresponds to a beacon frame (beacon), and a beacon frame (beacon) of a system (or a local area network) corresponding to the 802.11 series protocol is sent occupying a bandwidth of 20 MHz. The AP sends, on the first channel, a beacon frame (beacon) 1 corresponding to the first local area network (WLAN 1), where the first local area network may be an 802.11n local area network, information content of the beacon should include all content that should be included in a beacon as specified in an 802.11n standard protocol, mainly system information or a parameter of the 802.11n WLAN, for example, capability information of the AP, a service set identifier (SSID) of the WLAN, and information indicating a primary channel and a secondary channel of the WLAN. For the 802.11n WLAN in this example, the first channel is the primary channel of the WLAN, and the second channel may be indicated as the secondary channel of the WLAN.

The AP sends, on the second channel, a beacon frame beacon 2 corresponding to the second local area network (WLAN 2). The second local area network may be an 802.11a/b/g WLAN, that is, the beacon 2 includes system information of the 11a/b/g WLAN; or the second local area network may be an 802.11n WLAN with a system bandwidth of 20 MHz, that is, the beacon 2 is a beacon of an 802.11n system with a bandwidth of 20 MHz. For the 20 MHz WLAN, there is no concept of a primary/secondary channel, and a channel on which a beacon is sent is an operating channel of the WLAN. As can be seen, the operating channel of the WLAN 2 is the same as the secondary channel of the WLAN 1, that is, the operating channel of the WLAN 2 and an operating channel (including the primary/secondary channel) of the WLAN 1 overlap and both correspond to the second channel of the wireless local area network.

In this step, the AP may periodically send the first beacon frame to a first station by using the first channel, where the first station is a station connected to the WLAN 1; the AP may also periodically send the second beacon frame to a second station by using the second channel, where the second station is a station connected to the WLAN 2; or at the same time, the AP periodically sends the first beacon frame to a first station by using the first channel, and periodically sends the second beacon frame to a second station by using the second channel, which is not limited in this embodiment.

Optionally, the sent first beacon frame and second beacon frame overlap in time. In other words, when the first beacon frame sent by using the first channel and the second beacon frame sent by using the second channel overlap in time, start and end time boundaries of orthogonal frequency division multiplexing (OFDM) symbols of the first beacon frame and the second beacon frame are aligned.

The method may further include that: the sent first beacon frame and second beacon frame do not overlap in time. In other words, the first beacon frame sent by using the first channel and the second beacon frame sent by using the second channel do not overlap in time.

Optionally, if the first channel and the second channel are channels with a bandwidth of 20 MHz, and the first channel and the second channel are consecutive, the first beacon frame is sent by using all the bandwidth of the first channel, where the first beacon frame includes the system information of the first local area network, and the system information of the first local area network includes information indicating that the first local area network is an 802.11n WLAN with a system bandwidth of 40 MHz, and information indicating that the second channel is a secondary channel of the 802.11n WLAN, and certainly, may further include other information; and the second beacon frame is sent by using all the bandwidth of the second channel, where the second beacon frame includes the system information of the second local area network, and the system information of the second local area network includes information indicating that the second local area network is an 802.11a, 802.11b, 802.11g or 802.11n WLAN with a system bandwidth of 20 MHz, and certainly, may further include other information.

Optionally, if the first channel and the second channel are channels with a bandwidth of 40 MHz, and the first channel and the second channel are consecutive, the first beacon frame is sent by using a part of the bandwidth of the first channel, where the first beacon frame includes the system information of the first local area network, and the system information of the first local area network includes information indicating that the first local area network is an 802.11ac WLAN with a system bandwidth of 80 MHz, and information indicating that the second channel is a 40 MHz secondary channel of the 802.11ac WLAN; and the second beacon frame is sent by using a part of the bandwidth of the second channel, where the second beacon frame includes the system information of the second local area network, and the system information of the second local area network includes information indicating that the second local area network is an 802.11a, 802.11b, 802.11g, 802.11n or 802.11ac WLAN with a system bandwidth of 20 MHz, or information indicating that the second local area network is an 802.11n or 802.11ac WLAN with a system bandwidth (all available operating channels of a system) of the second channel 40 MHz.

If the first channel and the second channel are channels with a bandwidth of 80 MHz, the system information of the first local area network includes information indicating that the first local area network is an 802.11ac WLAN with a system bandwidth of 160 MHz, and information indicating that the second channel is an 80 MHz secondary channel of the 802.11ac WLAN; and the system information of the second local area network includes at least: information indicating that the second local area network is an 802.11a, 802.11b, 802.11g, 802.11n or 802.11ac WLAN with a system bandwidth of 20 MHz, or information indicating that the second local area network is an 802.11n or 802.11ac WLAN with a system bandwidth of the second channel 40 MHz, or information indicating that the second local area network is an 802.11ac WLAN with a system bandwidth (all available operating channels of a system) of the second channel 80 MHz.

Optionally, the method may further include: sending, by using all or a part of the bandwidth of the first channel, a first data frame to a station connected to the first local area network; and sending, by using all or a part of the bandwidth of the second channel, a second data frame to a station connected to the second local area network, where when the sent first data frame and second data frame overlap in time, start and end time of OFDM symbols of overlapping parts are aligned.

Optionally, after the determining a first channel and a second channel of a wireless local area network WLAN, the method may further include: dividing communication time into multiple consecutive time segments; and instructing, in each of the time segments, a station in at least one local area network of the first local area network and the second local area network not to compete for rights to use an operating channel of the local area network to which the station belongs.

The instructing a station in at least one local area network of the first local area network and the second local area network not to compete for rights to use an operating channel corresponding to the at least one local area network specifically includes: in each time segment, sending a frame on the operating channel of the at least one local area network, where a time length is set in a frame header of the frame, and the time length can cover each of the time segments.

The frame is sent on the operating channel of the at least one local area network, and the frame is a CTS-to-self frame.

In this embodiment, theoretically speaking, the communication time may be any time as long as it is ensured that during running of the wireless local area network, stations of the first local area network and the second local area network do not simultaneously send data to the AP, for example, time when a network is set up, or time when the AP is started, which is not limited in this embodiment.

The communication time may also be a segment of communication time that is taken from an entire communication process, the communication time includes multiple consecutive time segments, and in each time segment, it is ensured that a station of at most one local area network may compete for the channel.

In the embodiment of the present invention, an access point transmits different beacon frames by using different channels to set up different WLANs, so that protocol stations STAs (for example, an 802.11n STA, an 802.11a STA, an 802.11b STA, and an 802.11g STA) that support different bandwidths can be connected to the same access point by using the different WLANs, thereby solving the problem of a low utilization rate of system spectrum resources in the prior art, which arises because different protocol stations STAs are connected to an access point by using a same channel. In other words, in the embodiment of the present invention, an AP can send different beacon frames to stations in different local area networks by using different channels, so that the stations are connected to the AP by using corresponding channels (local area networks) and communicate by using the corresponding channels, thereby improving the utilization rate of the system spectrum resources.

Further, to further simplify a requirement for a receiver, the AP determines a WLAN in which a station is allowed to participate in competition for a corresponding channel and occupy the corresponding channel within a period of time; and indicates, to a station in a WLAN that is not expected to participate in the competition for the corresponding channel, that the corresponding channel is in a busy state. That is, only one action needs to be completed to receive data that may be sent by a station in the WLAN 1, thereby greatly simplifying a receiver on an AP side.

For ease of understanding by a person skilled in the art, the following uses specific application examples for description.

Figure 2:
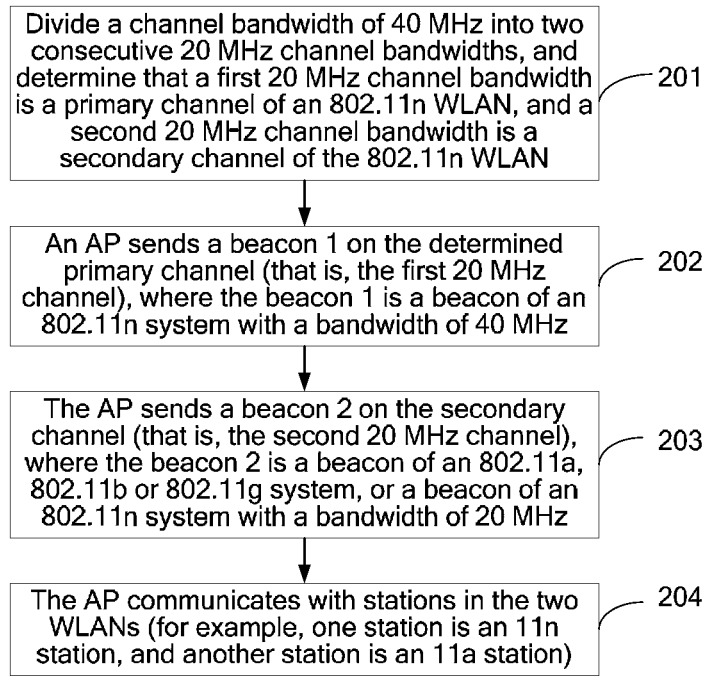
FIG. 2 is a flowchart of a first application example of a communication method in a wireless local area network according to an embodiment of the present invention.

Refer to FIG. 2, which is a flowchart of a first application example of a communication method in a wireless local area network according to an embodiment of the present invention. In this embodiment, a channel bandwidth (that is, a system bandwidth, or an available operating bandwidth of a wireless local area network) of 40 MHz is used as an example, but the present invention is not limited thereto. The method includes:

Step 201: Divide a channel bandwidth of 40 MHz into two consecutive 20 MHz channel bandwidths, and determine that a first 20 MHz channel bandwidth is a primary channel of an 802.11n WLAN, and a second 20 MHz channel bandwidth is a secondary channel of the 802.11n WLAN, where first and second in this embodiment do not represent any positional relationship.

In other words, for an 802.11n WLAN, its system bandwidth may be 20 MHz or 40 MHz. In this embodiment, it is assumed that an AP determines to set up an 802.11n WLAN with a bandwidth of 40 MHz. First, the AP needs to determine a frequency location of the 40 MHz spectrum, that is, start and end frequency positions, for example, from 2422 MHz to 2462 MHz. Next, as the 40 MHz spectrum includes two consecutive 20 MHz frequencies, the AP needs to determine which 20 MHz frequency of the 40 MHz is a primary channel of the WLAN, and which 20 MHz frequency is a secondary channel of the WLAN.

Step 202: An AP sends a beacon 1 on the determined primary channel (that is, the first 20 MHz channel), where the beacon 1 is a beacon of an 802.11n system with a bandwidth of 40 MHz.

The corresponding 802.11n WLAN in step 201 and step 202 is referred to as a WLAN 1 below. That the beacon 1 is a beacon of an 802.11n system with a bandwidth of 40 MHz indicates that information content of the beacon 1 should include all content that should be included in a beacon of a 40 MHz WLAN as specified in an 802.11n standard protocol, mainly system information/a parameter of the 802.11n WLAN, for example, capability information of the AP, a service set identifier (Service Set Identifier, SSID) of the WLAN, and information indicating the primary channel and the secondary channel of the WLAN. For the 802.11n WLAN in this example, the first 20 MHz channel is the primary channel of the WLAN, and the second 20 MHz channel may be indicated as the secondary channel of the WLAN. Moreover, for a station that scans each channel, if the station detects one beacon (such as a beacon), the station knows that there is one WLAN in an area in which the station is located, so that the station can choose to connect to one WLAN thereof. For a specific process of connection between the station and the WLAN, refer to an existing process.

Step 203: The AP sends a beacon 2 on the secondary channel (that is, the second 20 MHz channel), where the beacon 2 is a beacon of an 802.11a, 802.11b or 802.11g system, or a beacon of an 802.11n system with a bandwidth of 20 MHz.

In this embodiment, for the beacon sent on the second 20 MHz channel, a beacon of an 11n system with a bandwidth of 20 MHz is used as an example (a WLAN corresponding to the beacon 2 is referred to as a WLAN 2 below), that is, the WLAN 2 is an 11n WLAN, and the WLAN can operate in a maximum bandwidth of 20 MHz.

In this embodiment, step 202 and step 203 are not performed in order of time. Certainly, the beacons may also be sent simultaneously, which is not limited in the present invention.

Figure 3:
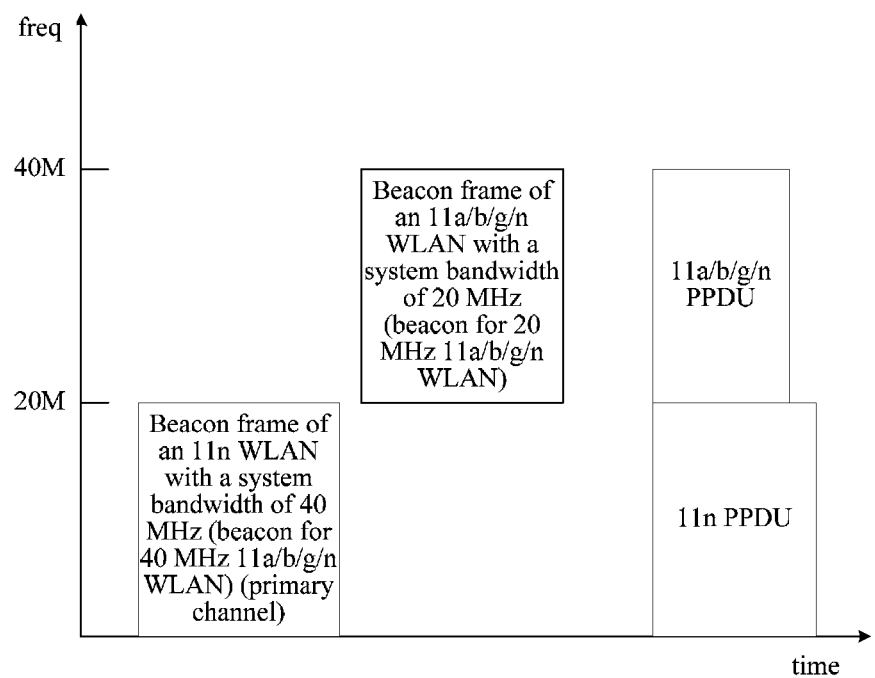
FIG. 3 is a schematic diagram of simultaneous sending of a beacon frame by two systems according to an embodiment of the present invention.
Figure 4:
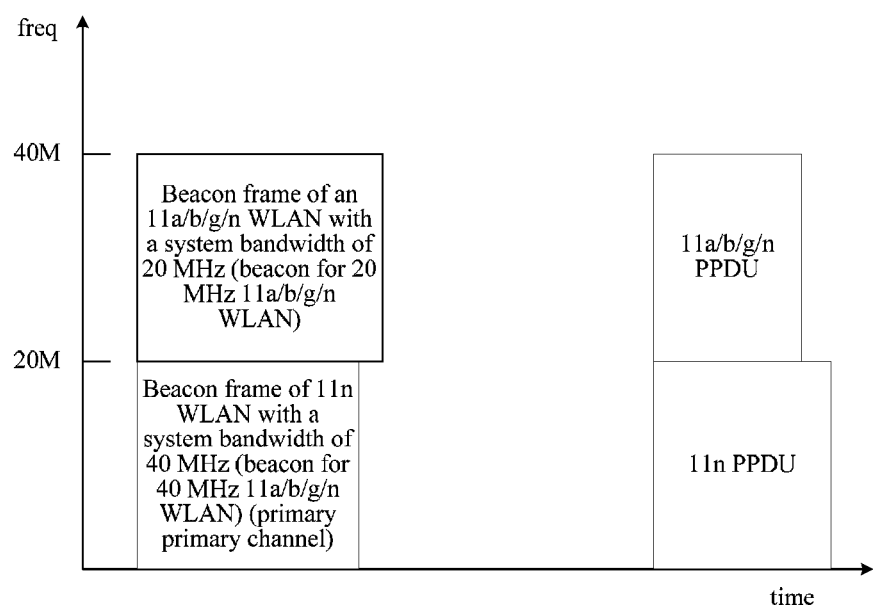
FIG. 4 is a schematic diagram of non-simultaneous sending of a beacon frame by two systems according to an embodiment of the present invention.

For example, beacons of both two systems (one is the 40 MHz WLAN 1, and the other is the 20 MHz WLAN 2) are sent periodically. Beacon frames sent by the two systems may overlap in time, and a schematic diagram corresponding thereto is shown in FIG. 4; or may not overlap, as shown in FIG. 3. FIG. 3 is a schematic diagram of simultaneous sending of a beacon frame by two systems according to an embodiment of the present invention, and FIG. 4 is a schematic diagram of non-simultaneous sending of a beacon frame by two systems according to an embodiment of the present invention.

It should be noted that basically all 802.11 protocol branches use an OFDM signal modulation mode. For a system using the OFDM signal modulation mode, in terms of time, one packet includes one or more OFDM symbols (including a cyclic prefix, Cyclic Prefix, CP); and in terms of frequency, a spectrum corresponding to the system is divided into multiple subcarriers (subcarriers or tones).

Figure 5:
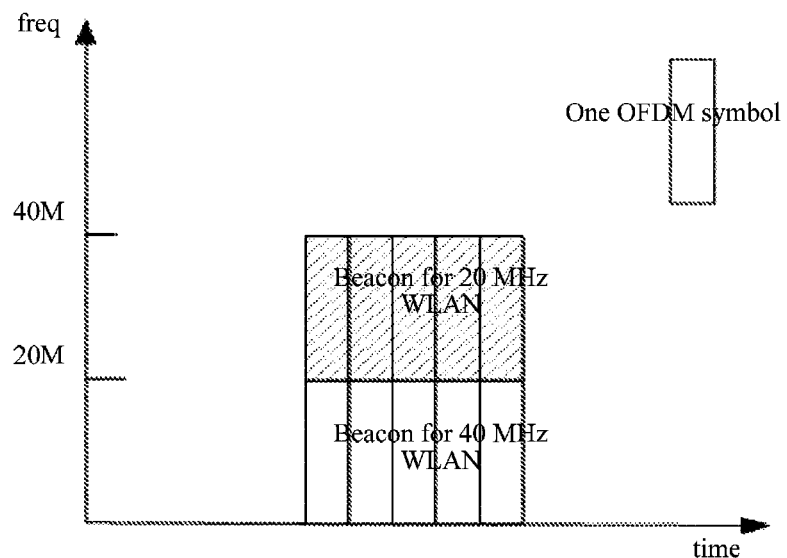
FIG. 5 is a schematic diagram of complete overlapping and aligning of boundaries of OFDM symbols according to an embodiment of the present invention.
Figure 6:
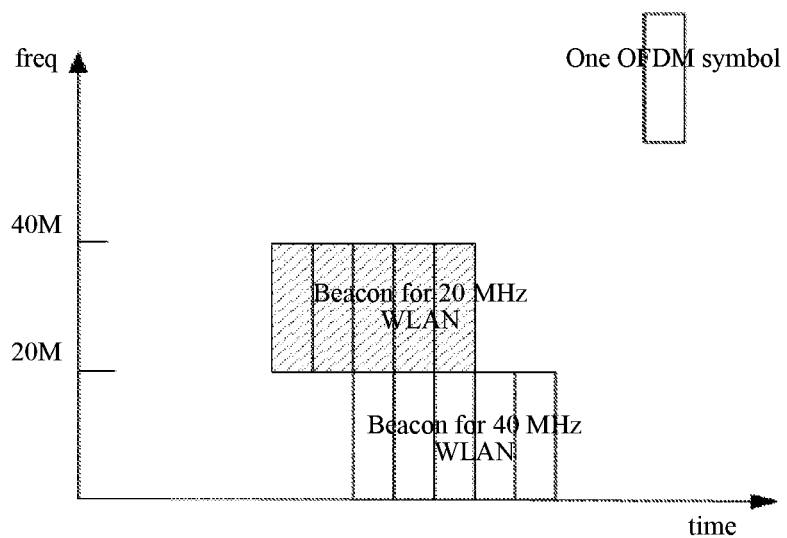
FIG. 6 is a schematic diagram of partial overlapping and partial aligning of boundaries of OFDM symbols according to an embodiment of the present invention.

Optionally, for a case in which the beacons of the two systems overlap in time, start and end boundaries of OFDM symbols of the beacon frames of the two systems need to be aligned (or synchronized), so as to eliminate interference between the systems. That is, for an 11n terminal (or 11n station) that accesses the 40 MHz 11n system WLAN 1 and can support receiving/sending of a 40 MHz packet, a receive link of the 11n terminal may always perform processing according to 40 MHz during product implementation. In this case, even though the beacon of the 40 MHz system is sent on the primary channel according to 20 MHz, the 11n terminal receives the entire 40 MHz for processing. If OFDM symbols are not aligned for the beacon 2 of the 20 MHz system that overlaps in time (noting that they do not overlap in frequency) with the beacon 1 of the 40 MHz system, the beacon 2 of the 20 MHz system may interfere with the beacon 1 of the 40 MHz system, where the interference is interference between OFDM subcarriers. If the OFDM symbols of the beacons of the two systems are aligned, according to OFDM technical principles, no interference occurs theoretically. However, in this embodiment, alignment of OFDM symbols is not restricted to that each OFDM symbol in one packet of two packets corresponds to and is aligned with one OFDM symbol in the other packet. It is only required that the two packets have parts that overlap in time, and the boundaries of the OFDM symbols are aligned. A schematic diagram of complete overlapping and aligning of the boundaries of the OFDM symbols is shown in FIG. 5. A schematic diagram of partial overlapping and partial aligning of the boundaries of the OFDM symbols is shown in FIG. 6. In the 802.11 protocol, a packet (including a beacon) has a preamble part (Preamble) and a data part. To further optimize the receiving and processing of the terminal, optionally, it may be further required that start positions of the beacons of the two systems should not be aligned, as shown in FIG. 6, that is, preamble parts of the two beacons should not overlap completely.

Certainly, in this embodiment, if the receive link of the 11n terminal is adjusted, according to an actual sending bandwidth of a received packet, to receive a signal of a certain bandwidth during implementation, the requirement for alignment of OFDM symbols is unnecessary, because the other 20 MHz beacon 2 is filtered out and no interference occurs.

Step 204: The AP communicates with stations in the two WLANs (for example, one station is an 11n station, and another station is an 11a station).

In this step, after the AP sends the beacon 1 of the 40 MHz system and the beacon 2 of the 20 MHz system, a station generally detects at least one of the beacons by scanning each channel, and the station knows that there is at least one WLAN in an area in which the station is located, so that the station can choose to connect to one WLAN thereof. For a specific process of connection between the station and the WLAN, refer to an existing process for 802.11a or 802.11b or 802.11g or 802.11n.

After the station is connected to one WLAN thereof, the station can communicate with the AP and another station in the WLAN. In a specific communication process, for a station, sending and receiving data by the station is completely the same as that in the prior art, because the station does not know that the AP operates by using the solution of the present invention. In other words, from a perspective of the WLAN 1 or WLAN 2 separately, for the station (not the AP), there is no difference between communication in each WLAN and communication in a single WLAN in the prior art.

For sending data by the AP to a station, there are several cases as follows:

Case 1: The AP sends data in a bandwidth of 40 MHz to a station in the 40 MHz system WLAN 1, and certainly, as a receiving end, the station is required to have a capability of supporting 40 MHz data.

Case 2: The AP sends, on the primary channel of the WLAN 1, data in a bandwidth of 20 MHz to a station in the 40 MHz system WLAN 1, and certainly, as a receiving end, the station is required to have a capability of supporting 20 MHz data.

Case 3: The AP sends, to a station in the 20 MHz system WLAN 2 and on an operating channel (that is, the 20 MHz corresponding to the secondary channel of the 40 MHz system WLAN 1) of the system, data in a bandwidth of 20 MHz, and certainly, as a receiving end, the station is required to have a capability of supporting 20 MHz data.

Case 4: The AP sends, to a station in the 40 MHz system WLAN 1 and on the primary channel of the WLAN, data in a bandwidth of 20 MHz; and sends, to a station in the 20 MHz system WLAN 2 and on the second 20 MHz channel (that is, the operating channel of the WLAN), 20 MHz data at the same time.

The foregoing only lists cases that can be supported when an AP sends data to a station in the technical solution of the present invention, but it is not necessarily required that all the cases occur in practice. Case 2 and case 3 generally occur in the case of a small data volume. When there is a large volume of data, the technical solution of the present invention can support case 1 and case 4, that is, channel resources are fully utilized.

Optionally, when case 4 occurs in practice, it is required that boundaries of OFDM symbols separately included in a 20 MHz packet that is sent on the primary channel of the WLAN 1 to the station in the 40 MHz system WLAN 1 and in a 20 MHz packet that is sent, in the 20 MHz system WLAN 2, to the station in the system are aligned (certainly, a tolerance is allowed in an actual case). It should be noted that it is not limited in this embodiment that each OFDM symbol in one packet of the two packets corresponds to and is aligned with one OFDM symbol in the other packet. It is only required that parts of the two packets overlap in time, and the boundaries of the OFDM symbols are aligned. A reason, a benefit and the like of this requirement are the same as those in a case in which two beacons overlap, and details are not described again. In the 802.11 protocol, a packet (including a beacon) has a preamble part (Preamble) and a data part. To further optimize the receiving and processing of the terminal, optionally, it may be further required that start positions of the 20 MHz packet that is sent on the primary channel of the WLAN 1 to the station in the 40 MHz system WLAN 1 and of the 20 MHz packet that is sent, in the 20 MHz system WLAN 2, to the station in the system should not be aligned, that is, preamble parts of the two packets should not overlap completely.

For sending data by a station to the AP, there are several cases as follows:

Case 1: Only a station in the 40 MHz system WLAN 1 sends data packet to the AP, where the packet is a 40 MHz packet.

Case 2: Only a station in the 20 MHz system WLAN 2 sends 20 MHz data on the 20 MHz operating channel of the system.

Case 3: Only a station in the 40 MHz system WLAN 1 sends, on the primary channel of the WLAN 1, 20 MHz data to the AP.

Case 4: A station in the 40 MHz system WLAN 1 sends, on the primary channel of the WLAN 1, 20 MHz data to the AP, and a station in the 20 MHz system WLAN 2 sends 20 MHz data to the AP at the same time.

A station that is connected to the 20 MHz system WLAN 2 and a station that is connected to the 40 MHz system WLAN 1 are independent from each other. In addition, for an 802.11a, 802.11b, 802.11g or 802.11n system, an AP cannot control absolute time at which a station sends data to the AP, and all the foregoing 4 cases may occur. Particularly, when case 4 occurs, OFDM symbols of data that is sent by the station in the 20 MHz system WLAN 2 to the AP and data that is sent to the AP by the station in the 40 MHz system WLAN 1 on the primary channel of the WLAN 1 are not aligned generally. Therefore, the AP cannot receive (at one time) both pieces of 20 MHz data by using one 40 MHz receive link, because boundaries of the OFDM symbols do not overlap, and mutual interference occurs. In addition, the AP cannot know in advance which case of the 4 cases occurs. Therefore, preferably, a receiver on an AP side needs to complete the following three actions simultaneously: receiving data only on the primary channel of the 40 MHz system WLAN 1, receiving data only on a channel of the 20 MHz system WLAN 2, and receiving data in the bandwidth of entire 40 MHz.

Further, in the foregoing embodiment, the receiver on the AP side is required to complete the three actions simultaneously. To further simplify the requirement for the receiver, optionally, this embodiment may further include the following steps:

The AP determines a WLAN in which a station is allowed to participate in competition for a corresponding channel and occupy the corresponding channel within a period of time, and indicates, to a station in a WLAN that is not expected to participate in the competition for the corresponding channel, that the corresponding channel is in a busy state. For example, in a time segment T, the AP does not hope that a station in the WLAN 2 participates in competition for the operating channel of the WLAN 2, which is the second 20 MHz channel in this embodiment, and therefore, the AP may indicate to the station in the WLAN 2 that the operating channel of the WLAN 2 is in a busy state. A specific method for indicating to the station in the WLAN 2 that the operating channel of the WLAN 2 is in the busy state includes but is not limited to: sending a frame on a same channel on which the beacon 2 is sent, which is the second 20 MHz channel in this embodiment; and indicating a time length in a frame header of the frame, where the time length enables time counting to be started from a start position or an end position of the frame, and the indicated time length can cover the "time segment T". Particularly, the frame may be a CTS-to-self (clear to send-to-self) frame in the 802.11 protocol (for example, 802.11b/g/n).

In the 802.11 protocol (for example, 802.11b/g/n), there are two methods for determining, by a station, whether a channel is in a busy or an idle state: One is physical listening, and the other is virtual listening. The physical listening indicates that a station determines, by performing energy detection on a channel, whether another station or an AP is using the channel to transmit a signal, if yes, determines that the channel is in a busy state, and otherwise, determines that the channel is in an idle state; and the station cannot compete for the channel only until the channel is in an idle state. The virtual listening indicates that a station determines, according to a time length indication in a frame header of a received and demodulated frame, whether the channel is in a busy state a subsequent time segment; if the channel can be determined to be in a busy state according to a time segment that can be covered by the indicated time length in the frame header, the station may neither perform physical listening on the channel, nor compete for the channel in the time segment in which the channel is determined to be in a busy state. Certainly, the foregoing two methods may also be used in combination. For a station in the WLAN 1, because a frame with a set time length is sent on the secondary channel of the WLAN 1, the station in the WLAN 1 may set aside setting of the time length on the secondary channel according to the 802.11n protocol; that is, the virtual listening method is not applied on the secondary channel, and only the physical listening method is applied. For determining the busy or idle state of the primary channel, the station in the WLAN 1 may combine the physical listening with the virtual listening. This is completely the same as an operating mechanism in the existing 802.11n protocol. That is, if the primary channel is determined to be in the busy state, the station in the WLAN 1 does not compete for the channel; if the primary channel is determined to be in the idle state and the secondary channel is in a busy state based on physical listening, the station may compete only for the primary channel to send data; and if the primary channel is determined to be in the idle state and the physical listening of the secondary channel is also in the idle state, the station may compete for both the primary and secondary channels to simultaneously send data on them. Therefore, there is no impact on a channel competition mechanism in the WLAN 1, and the station in the WLAN 1 can compete for the channel and occupy the channel to send data to the AP as long as it is determined that the channel is in the idle state. In other words, in a "time segment T", there is no impact on sending data by the AP to the station (which may also be referred to as downlink DL), and all the 4 cases may occur; for sending data by the station to the AP (which may also be referred to as uplink UL), only the station in the WLAN 1 may send data to the AP, that is, only case 1 and case 3 may occur. In this way, same as the operating mechanism in which an AP sets up a WLAN 1 in the prior art, the receiver on the AP side needs to complete only one action to receive data that may be sent by the station in the WLAN 1, for example, complete only one action to receive data in the bandwidth of entire 40 MHz, which greatly simplifies the receiver on the AP side compared with completion of three actions before simplification.

For another example, in a time segment T, the AP does not hope that a station in the WLAN 1 participates in competition for the operating channel of the WLAN 1, and therefore, the AP may indicate to the station in the WLAN 1 that the operating channel of the WLAN 1 is in a busy state. A specific method for indicating to the station in the WLAN 1 that the operating channel of the WLAN 1 is in the busy state includes but is not limited to: sending a frame on a same channel on which the beacon 1 is sent, and indicating a time length in a frame header of the frame, where the time length enables time counting to be started from a start position or an end position of the frame, and the indicated time length can cover the "time segment T". Particularly, the frame may be a CTS-to-self frame in the 802.11 protocol (for example, 802.11b/g/n). Similar to the foregoing paragraph, after the station in the WLAN 1 receives the frame, if the time length in the frame header of the frame can cover the "time segment T", the station in the WLAN 1 determines that the primary channel (including the secondary channel) is in the busy state, and therefore, does not compete for the channel. However, a station in the WLAN 2 does not receive such a time setting, so that there is no impact on the station in the WLAN 2, and the station in the WLAN 2 can compete for the operating channel of the WLAN 2, which is the second 20 MHz channel in this embodiment. In other words, in a "time segment T", there is no impact on sending data by the AP to the station (which may also be referred to as downlink DL), and all the 4 cases may occur; for sending data by the station to the AP (which may also be referred to as uplink UL), only the station in the WLAN 2 may send data to the AP, that is, only case 2 may occur. In other words, same as the operating mechanism in which an AP sets up a WLAN 2 in the prior art, the receiver on the AP side needs to complete only one action to receive data that may be sent by the station in the WLAN 2, which greatly simplifies the receiver on the AP side compared with completion of three actions before simplification.

Figure 6A:
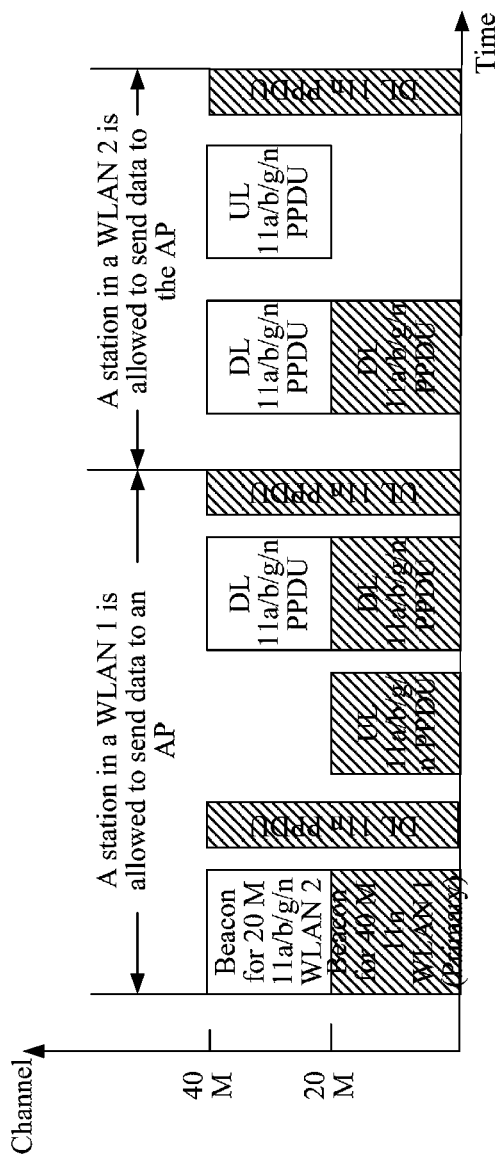
FIG. 6A is a schematic diagram of alternately setting a time length in two WLANs so that at any time a station only in one WLAN sends data to an AP according to an embodiment of the present invention.

In a word, adding the foregoing steps does not have impact on sending data by the AP to the station, and for sending data by the station to the AP, it allows a station only in one of the WLANs to send data to the AP in a time segment, thereby simplifying the receiver on the AP side. As shown in FIG. 6A, FIG. 6A is a schematic diagram of alternately setting a time length in two WLANs so that at any time a station only in one WLAN sends data to an AP according to an embodiment of the present invention. In other words, in this figure, a time length is alternately set in the two WLANs so that at any time a station only in one WLAN may send data to the AP, thereby simplifying the receiver on the AP side. In an indicated time segment in which "a station in the WLAN 1 is allowed to send data to the AP", the AP may send data to a station in one WLAN thereof or may simultaneously send data to stations in the two WLANs as required; however, only a station in the WLAN 1 can send data to the AP. An indicated time segment in which "a station in the WLAN 2 is allowed to send data to the AP" follows a similar line.

Moreover, in a current 802.11 protocol suite, 802.11ac supports more features than 802.11n, for example, bandwidths that can be supported by 802.11ac include 20 MHz, 40 MHz, 80 MHz, and 160 MHz. Therefore, if an 802.11ac STA and an 802.11n STA are simultaneously connected to an 80 MHz or 160 MHz 802.11ac WLAN, the 802.11n STA can occupy only a 40 MHz channel at most when occupying a channel for communication, and a remaining spectrum is wasted. As a result, a problem that exists is similar to that in the foregoing embodiments, and a similar method may be used to improve spectrum efficiency.

Figure 7:
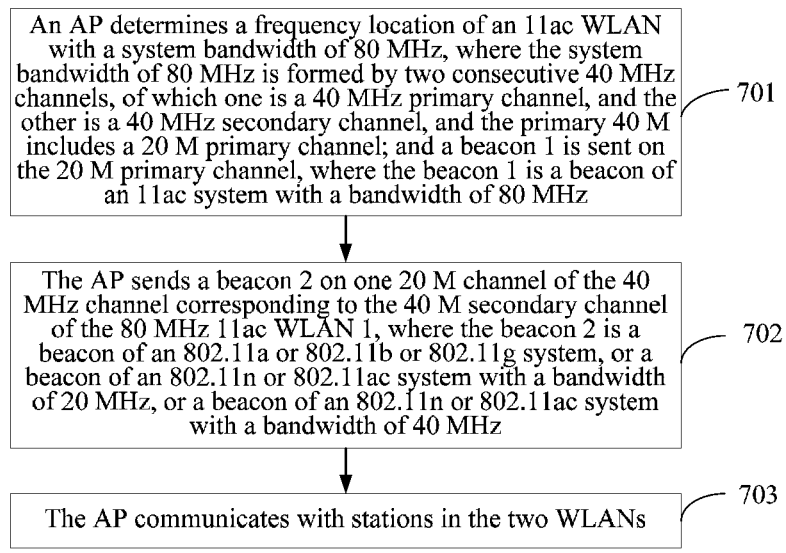
FIG. 7 is a flowchart of a second application example of a communication method in a wireless local area network according to an embodiment of the present invention.

Refer to FIG. 7, which is a flowchart of a second application example of a communication method in a wireless local area network according to an embodiment of the present invention. This embodiment is described by using an 11ac WLAN with a system bandwidth of 80 MHz as an example, and specifically includes:

Step 701: An AP determines a frequency location of the 11ac WLAN with a system bandwidth of 80 MHz, where the system bandwidth of 80 MHz includes two consecutive 40 MHz channels, of which one is a 40 MHz primary channel, and the other is a 40 MHz secondary channel, and the primary 40 MHz channel includes a 20 MHz primary channel; and a beacon 1 is sent on the 20 MHz primary channel, where the beacon 1 is a beacon of an 11ac system with a bandwidth of 80 MHz, that is, information in the beacon should include all information that should be included in a beacon as specified in the 802.11ac standard protocol.

Specifically, for an 802.11ac WLAN, its system bandwidth may be 20 MHz, 40 MHz, 80 MHz and 160 MHz. When the AP determines to set up an 802.11ac WLAN with a bandwidth of 80 MHz, the AP first needs to determine a frequency location of the 80 MHz spectrum, that is, start and end frequency positions; next, the 80 MHz spectrum includes two consecutive 40 MHz frequencies, of which one 40 MHz is the 40 MHz primary channel, and the other is the 40 MHz secondary channel, where one 20 MHz channel of the 40 MHz primary channel is the 20 MHz primary channel. The 80 MHz 11ac WLAN is referred to as a WLAN 1 below.

Step 702: The AP sends a beacon 2 on one 20 MHz channel of the 40 MHz channel corresponding to the 40 MHz secondary channel of the 80 MHz 11ac WLAN 1, where the beacon 2 is a beacon of an 802.11a or 802.11b or 802.11g system, or a beacon of an 802.11n or 802.11ac system with a bandwidth of 20 MHz, or a beacon of an 802.11n or 802.11ac system with a bandwidth of 40 MHz.

Specifically, when it is the 802.11n or ac 40 MHz WLAN that is set up in step 702, the 20 MHz channel on which the beacon 2 corresponding to the WLAN is located is the 20 MHz primary channel of the 802.11n or ac WLAN, and the other 20 MHz channel is the 20 MHz secondary channel of the 802.11n or ac WLAN.

For ease of description, the WLAN that is set up in step 702 is referred to as a WLAN 2 below, and it is assumed that the WLAN 2 is a 40 MHz 11n WLAN. It should be noted that, step 701 and step 702 are not performed in order of time, and may also be performed simultaneously.

Figure 8:
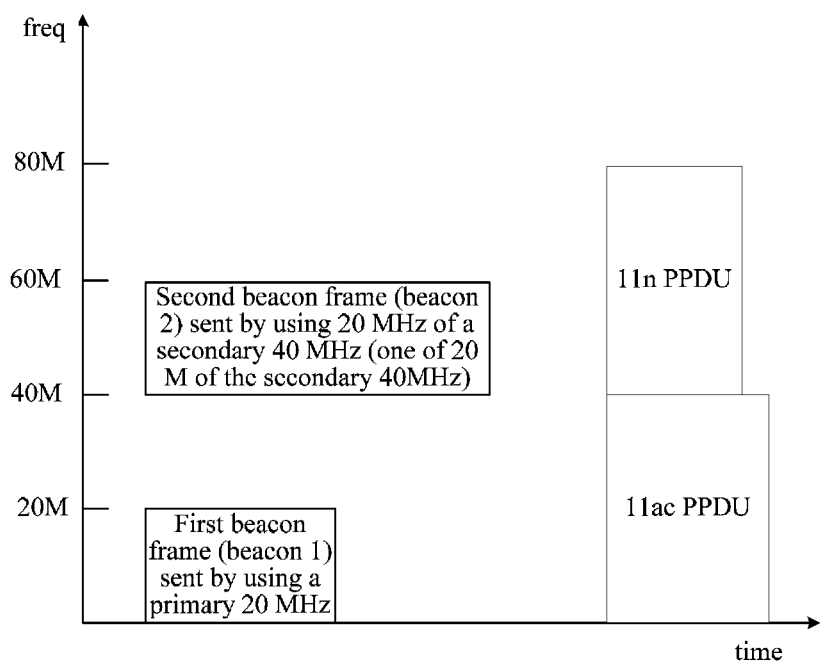
FIG. 8 is a schematic diagram showing that beacon frames sent by two systems overlap in time according to an embodiment of the present invention.
Figure 9:
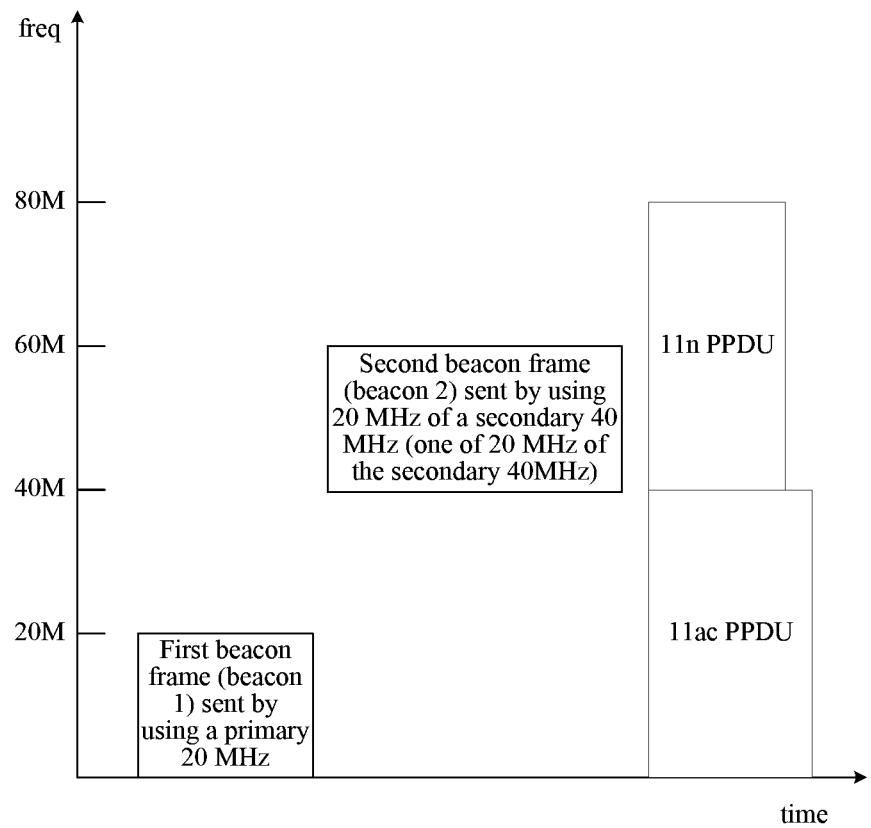
FIG. 9 is a schematic diagram showing that beacon frames sent by two systems do not overlap in time according to an embodiment of the present invention.

Specifically, beacons of the two systems (one is the 80 MHz 11ac WLAN 1, and the other is the WLAN 2) are sent periodically. The beacon frames sent by the two systems may overlap in time, as shown in FIG. 8; or may not overlap in time, as shown in FIG. 9. FIG. 8 is a schematic diagram showing that beacon frames sent by two systems overlap in time according to an embodiment of the present invention. FIG. 9 is a schematic diagram showing that beacon frames sent by two systems do not overlap in time according to an embodiment of the present invention.

Moreover, basically all 802.11 protocol branches use an OFDM signal modulation mode. For a system using the OFDM signal modulation mode, in terms of time, one packet includes one or more OFDM symbols (including a cyclic prefix (CP)); and in terms of frequency, a spectrum corresponding to the system is divided into multiple subcarriers (subcarriers or tones). Optionally, for a case in which the beacons of the two systems overlap in time, start and end boundaries of OFDM symbols of the beacon frames of the two systems need to be aligned (or synchronized). A benefit of such consideration is that for an 11ac terminal (or station, similarly hereinafter) that is connected to the 80 MHz 11ac system WLAN 1 and can support receiving/sending of an 80 MHz packet, a receive link of the 11ac terminal may always perform processing according to 80 MHz during product implementation. In this case, even though the beacon of the 80 MHz system is sent on the 20 MHz primary channel according to 20 MHz, the 11ac terminal receives the entire 80 MHz for processing. If OFDM symbols are not aligned for the beacon 2 of the WLAN 2 that overlaps in time with the beacon 1 of the 80 MHz system, the beacon 2 of the WLAN 2 may interfere with the beacon 1 of the 80 MHz system, where the interference is interference between OFDM subcarriers. If the OFDM symbols of the beacons of the two systems are aligned, according to OFDM technical principles, no interference occurs theoretically. It should be noted that alignment of OFDM symbols is not restricted to that each OFDM symbol in one packet of two packets corresponds to and is aligned with one OFDM symbol in the other packet. It is only required that the two packets have parts that overlap in time, and the boundaries of the OFDM symbols are aligned. In the 802.11 protocol, a packet (including a beacon) has a preamble part (Preamble) and a data part. To further optimize the receiving and processing of the terminal, optionally, it may be further required that start positions of the beacons of the two systems should not be aligned, that is, preamble parts of the two beacons should not overlap completely.

Certainly, if the receive link of the 11ac terminal is adjusted, according to an actual sending bandwidth of a received packet, to receive a signal of a certain bandwidth during implementation, the requirement for alignment of OFDM symbols is unnecessary, because the beacon 2 of the WLAN 2 is filtered out and no interference occurs.

Step 703: The AP communicates with stations in the two WLANs.

Specifically, after the AP sends the beacon 1 of the 80 MHz system WLAN 1 and the beacon 2 of the WLAN 2, a station generally detects at least one of the beacons by scanning each channel, and the station knows that there is at least one WLAN in an area in which the station is located, so that the station can choose to connect to one WLAN thereof. For a specific process of connection between the station and the WLAN, refer to an existing process for 802.11a/b/g/n/ac. Details are not described herein again.

After the station is connected to one WLAN thereof, the station can communicate with the AP and another station in the WLAN. In a specific communication process, for a station, sending and receiving data by the station is completely the same as that in the prior art, because the station does not know that the AP operates by using the solution of the present invention. In other words, from a perspective of the WLAN 1 or WLAN 2 separately, for the station (not the AP), there is no difference between communication in each WLAN and communication in a single WLAN in the prior art.

For sending data by the AP to a station, there are at least several cases as follows:

Case 1: The AP sends data in a bandwidth of 80 MHz to a station in the 80 MHz system WLAN 1, and certainly, as a receiving end, the station is required to have a capability of supporting 80 MHz data.

Case 2: The AP sends, on the 40 MHz primary channel, data in a bandwidth of 40 MHz to a station in the 80 MHz system WLAN 1, and certainly, as a receiving end, the station is required to have a capability of supporting 40 MHz data.

Case 3: The AP sends, to a station in the WLAN 2 and on an operating channel (that is, the 40 M secondary channel corresponding to the 80 MHz system WLAN 1) of the system, data in a bandwidth of 40 MHz, and certainly, as a receiving end, the station is required to have a capability of supporting 40 MHz data.

Case 4: The AP sends, to a station in the 80 MHz system WLAN 1 and on the 40 MHz primary channel, data in a bandwidth of 40 MHz; and sends, to a station in the WLAN 2 and on the 40 MHz operating channel corresponding to the system WLAN 2, 40 MHz data at the same time.

The foregoing only lists cases that at least can be supported when an AP sends data to a station in the solution of the present invention, but it is not necessarily required that all the cases occur in practice.

Optionally, when case 4 occurs in practice, it is required that boundaries of OFDM symbols separately included in a 40 MHz packet that is sent on the 40 MHz primary channel of the 80 MHz 11ac system to the station and in a 40 MHz packet that is sent, in the WLAN 2, to the station in the system should be aligned (certainly, a tolerance is allowed in an actual case). It should be noted that it is not limited that each OFDM symbol in one packet of the two packets corresponds to and is aligned with one OFDM symbol in the other packet. It is only required that parts of the two packets overlap in time, and the boundaries of the OFDM symbols are aligned. A reason, a benefit and the like of this requirement are the same as those in a case in which two beacons overlap, and details are not described again. In the 802.11 protocol, a packet (including a beacon) has a preamble part (Preamble) and a data part. To further optimize the receiving and processing of the terminal, optionally, it may be further required that start positions of the 40 MHz packet that is sent on the 40 MHz primary channel of the 80 MHz 11ac system to the station and of the 40 MHz packet that is sent, in the WLAN 2, to the station in the system should not be aligned, that is, preamble parts of the two packets should not overlap completely.

For sending data by a station to the AP, there are several cases as follows:

Case 1: Only a station in the 80 MHz 11ac system sends data packet to the AP, where the packet is an 80 MHz packet.

Case 2: Only a station in the WLAN 2 sends 40 MHz data on the 40 MHz channel of the system.

Case 3: Only a station in the 80 MHz 11ac system sends, on the 40 MHz primary channel, 40 MHz data to the AP.

Case 4: A station in the 80 MHz 11ac system sends, on the 40 M primary channel, 40 MHz data to the AP, and a station in the WLAN 2 sends 40 MHz data to the AP at the same time.

A station that is connected to the 80 MHz 11ac system and a station that is connected to a WLAN 2 are independent from each other. In addition, for an 802.11a, 802.11b, 802.11g, 802.11n or 802.11ac system, an AP cannot control absolute time at which a station sends data to the AP, and all the foregoing 4 cases may occur. Particularly, when case 4 occurs, OFDM symbols of data that is sent by the station in the WLAN B to the AP and data that is sent to the AP by the station in the 80 MHz 11ac system on the primary channel are not aligned generally. Therefore, the AP cannot receive both pieces of 40 M data by using one 80 MHz receive link, because boundaries of the OFDM symbols do not overlap, and mutual interference occurs. In addition, the AP cannot know in advance which case occurs. Therefore, preferably, a receiver of the AP needs to complete the following three actions simultaneously: receiving data only on the 40 MHz primary channel of the 80 MHz 11ac system, receiving data only on the 40 MHz secondary system channel, and receiving data in the channel bandwidth of entire 80 MHz.

This embodiment is similar to the first application example. Optionally, to simplify the receiver on the AP side, on the basis of this embodiment, the following may be used: After the determining a first channel and a second channel of a wireless local area network WLAN, the method may further include: dividing communication time into multiple consecutive time segments; and instructing, in each of the time segments, a station in at least one local area network of a first local area network and a second local area network not to compete for rights to use an operating channel corresponding to the at least one local area network, that is, instructing, in each of the time segments, a station in at least one local area network of the first local area network and the second local area network not to compete for rights to use an operating channel of the local area network to which the station belongs. For a specific implementation process thereof, refer to the corresponding simplification process in the foregoing first application example. Details are not described herein again.

In the foregoing description, 80 MHz is used as an example. When the 11ac system bandwidth is 40 MHz or 160 MHz, a similar method may be used to improve the spectrum efficiency. For details, refer to the foregoing description. Details are not described herein again.

Figure 10:
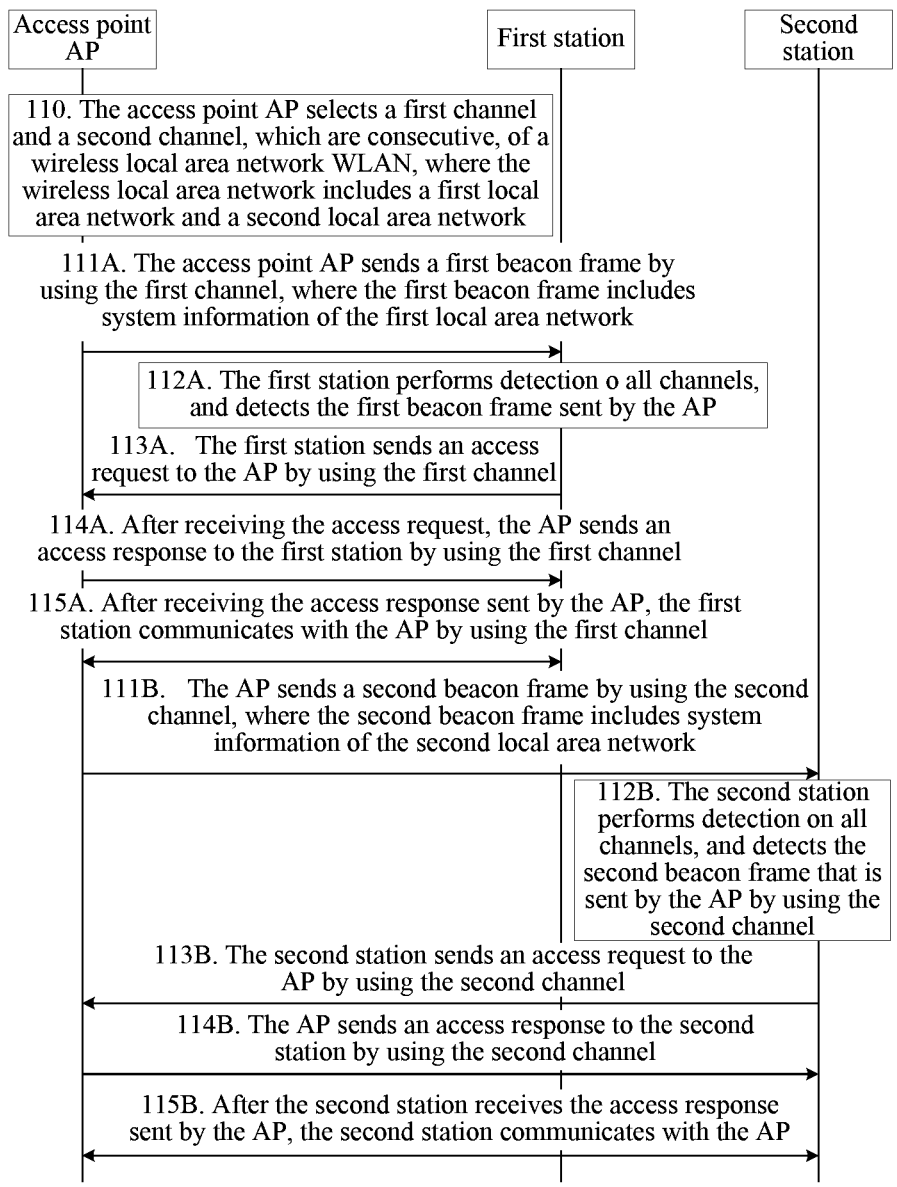
FIG. 10 is an application interaction flowchart of a communication method in a wireless local area network according to an embodiment of the present invention.

Referring to FIG. 10, FIG. 10 is an application interaction flowchart of a communication method in a wireless local area network according to an embodiment of the present invention, which specifically includes:

Step 110: An access point AP selects a first channel and a second channel, which are consecutive, of the wireless local area network WLAN, where the wireless local area network includes a first local area network and a second local area network.

Step 111A: The access point AP sends a first beacon frame by using the first channel, where the first beacon frame includes system information of the first local area network.

Step 112A: A first station performs detection on all channels, and detects the first beacon frame sent by the AP.

Step 113A: The first station sends an access request to the AP by using the first channel.

Step 114A: After receiving the access request, the AP sends an access response to the first station by using the first channel.

Step 115A: After receiving the access response sent by the AP, the first station communicates with the AP by using the first channel.

Step 111B: The AP sends a second beacon frame by using the second channel, where the second beacon frame includes system information of the second local area network.

Step 112B: A second station performs detection on all channels, and detects the second beacon frame that is sent by the AP by using the second channel.

Step 113B: The second station sends an access request to the AP by using the second channel.

Step 114B: The AP sends an access response to the second station by using the second channel.

Step 115B: After the second station receives the access response sent by the AP, the second station communicates with the AP.

In this embodiment, step 111A to step 115A are implemented simultaneously with step 111B to step 115B. Optionally, in a process of simultaneous implementation, if the sent first beacon frame and second beacon frame overlap in time, orthogonal frequency division multiplexing OFDM symbols of parts, overlapping in time, in the first beacon frame and the second beacon frame are aligned; if a sent first data frame and a sent second data frame overlap in time, OFDM symbols of parts overlapping in time are aligned.

In this embodiment, the process in which the stations (the first station and the second station) detect the beacon frames (that is, the first beacon frame and the second beacon frame) sent by the AP, and the subsequent initiation of the access requests are known to a person skilled in the art, and details are not described herein again.

Figure 11:
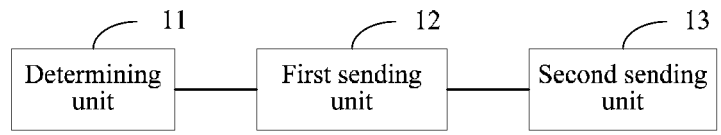
FIG. 11 is a schematic structural diagram of a communications apparatus in a wireless local area network according to an embodiment of the present invention.

Based on the implementation process of the foregoing method, an embodiment of the present invention further provides a communications apparatus in a wireless local area network, of which a schematic structural diagram is shown in FIG. 11. The apparatus includes: a determining unit 11, a first sending unit 12 and a second sending unit 13, where the determining unit 11 is configured to determine a first channel and a second channel of the wireless local area network WLAN, where the first channel and the second channel are consecutive, and the wireless local area network includes a first local area network and a second local area network; the first sending unit 12 is configured to send a first beacon frame by using all or a part of a bandwidth of the first channel, where the first beacon frame includes system information of the first local area network; and the second sending unit 13 is configured to send to a second beacon frame by using all or a part of a bandwidth of the second channel, where the second beacon frame includes system information of the second local area network.

Optionally, the first beacon frame sent by the first sending unit and the second beacon frame sent by the second sending unit may not overlap in time, or may overlap in time, or overlap.

Optionally, to reduce mutual interference that occurs when different beacon frames are sent at the same time by using different channels, the apparatus may further include: a first aligning unit, configured to: when the first beacon frame sent by the first sending unit and the second beacon frame sent by the second sending unit overlap in time, align orthogonal frequency division multiplexing OFDM symbols of parts, overlapping in time, in the first beacon frame and the second beacon frame.

Optionally, if the first channel and the second channel that are determined by the determining unit are channels with a bandwidth of 20 MHz, and the first channel and the second channel are consecutive, the first sending unit is specifically configured to send the first beacon frame by using all of the bandwidth of the first channel, where the first beacon frame includes the system information of the first local area network, and the system information of the first local area network includes: information indicating that the first local area network is an 802.11n WLAN with a system bandwidth of 40 MHz, and information indicating that the second channel is a secondary channel of the 802.11n WLAN; and the second sending unit is specifically configured to send the second beacon frame by using all of the bandwidth of the second channel, where the second beacon frame includes the system information of the second local area network, and the system information of the second local area network includes: information indicating that the second local area network is an 802.11a, 802.11b, 802.11g or 802.11n WLAN with a system bandwidth of 20 MHz.

Optionally, if the first channel and the second channel that are determined by the determining unit are channels with a bandwidth of 40 MHz, and the first channel and the second channel are consecutive, the first sending unit is specifically configured to send the first beacon frame by using a part of the bandwidth of the first channel, where the first beacon frame includes the system information of the first local area network, and the system information of the first local area network includes: information indicating that the first local area network is an 802.11ac WLAN with a system bandwidth of 80 MHz, and information indicating that the second channel is a 40 MHz secondary channel of the 802.11ac WLAN; and the second sending unit is specifically configured to send the second beacon frame by using a part of the bandwidth of the second channel, where the second beacon frame includes the system information of the second local area network, and the system information of the second local area network includes: information indicating that the second local area network is an 802.11a, 802.11b, 802.11g or 802.11n WLAN with a system bandwidth of 20 MHz, or information indicating that the second local area network is an 802.11n or 802.11ac WLAN with a system bandwidth of the second channel 40 MHz.

If the first channel and the second channel that are determined by the determining unit are channels with a bandwidth of 80 MHz, the first sending unit is specifically configured to send the first beacon frame by using a part of the bandwidth of the first channel, where the first beacon frame includes the system information of the first local area network, and the system information of the first local area network includes: information indicating that the first local area network is an 802.11ac WLAN with a system bandwidth of 160 MHz, and information indicating that the second channel is an 80 MHz secondary channel of the 802.11ac WLAN; and the second sending unit is specifically configured to send the second beacon frame by using a part of the bandwidth of the second channel, where the second beacon frame includes the system information of the second local area network, and the system information of the second local area network includes: information indicating that the second local area network is an 802.11a, 802.11b, 802.11g, 802.11n or 802.11ac WLAN with a system bandwidth of 20 MHz, or information indicating that the second local area network is an 802.11n or 802.11ac WLAN with a system bandwidth of the second channel 40 MHz, or information indicating that the second local area network is an 802.11ac WLAN with a system bandwidth of the second channel 80 MHz.

In the foregoing embodiment, the apparatus may further include: a third sending unit and a fourth sending unit, where the third sending unit is connected to the first sending unit and configured to send, by using all or a part of the bandwidth of the first channel, a first data frame to a station connected to the first local area network; and the fourth sending unit is connected to the second sending unit and configured to send, by using all or a part of the bandwidth of the second channel, a second data frame to a station connected to the second local area network.

Optionally, to reduce mutual interference that occurs when different data frames are sent at the same time by using different channels, the apparatus may further include: a second aligning unit, configured to: when the first data frame sent by the third sending unit and the second data frame sent by the fourth sending unit overlap in time, align OFDM symbols of parts, overlapping in time, in the first data frame and the second data frame.

Optionally, to simplify a requirement for a receiver, the apparatus may further include: a dividing unit and an instructing unit, where the dividing unit is configured to divide communication time into multiple consecutive time segments after the determining unit determines the first channel and the second channel of the wireless local area network WLAN; and the instructing unit is configured to instruct, in each of the time segments divided by the dividing unit, a station in at least one local area network of the first local area network and the second local area network not to compete for rights to use an operating channel of the local area network to which the station belongs.

The instructing unit is specifically configured to: in each of the time segments divided by the dividing unit, send a frame on the operating channel of the at least one local area network, where a time length is set in a frame header of the frame, and the time length can cover each of the time segments. The frame is sent on the operating channel of the at least one local area network, and the frame is a CTS-to-self frame.

In this embodiment, for a definition of the communication time, specifically refer to the foregoing description. Details are not described herein again.

For an implementation process of functions and effects of the units in the apparatus, refer to the corresponding implementation process in the foregoing method. Details are not described herein again.

Figure 12:
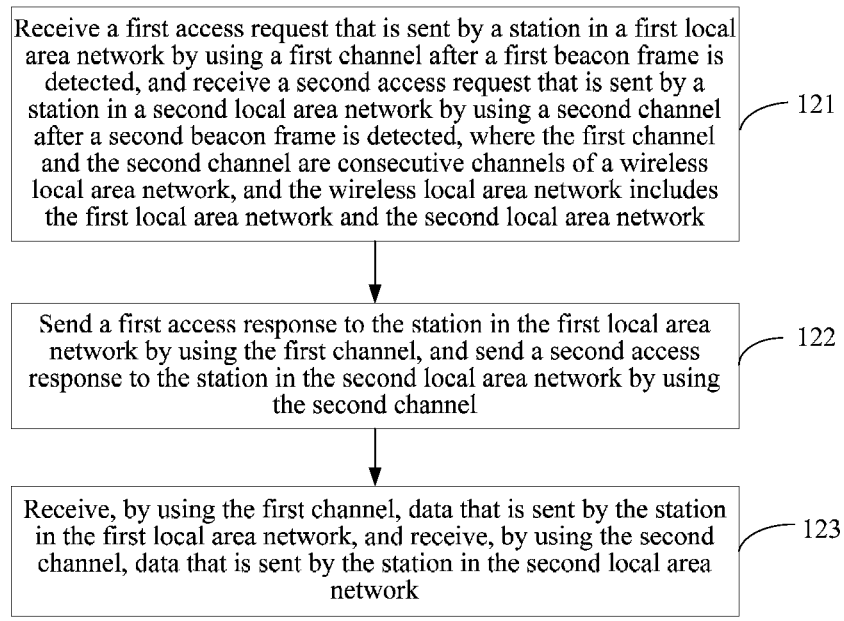
FIG. 12 is a flowchart of a data receiving method according to an embodiment of the present invention.

Refer to FIG. 12, which is a flowchart of a data receiving method according to an embodiment of the present invention. The method includes:

Step 121: Receive a first access request that is sent by a station in a first local area network by using a first channel after a first beacon frame is detected, and receive a second access request that is sent by a station in a second local area network by using a second channel after a second beacon frame is detected, where the first channel and the second channel are consecutive channels of a wireless local area network, and the wireless local area network includes the first local area network and the second local area network.

Step 122: Send a first access response to the station in the first local area network by using the first channel, and send a second access response to the station in the second local area network by using the second channel.

Step 123: Receive, by using the first channel, data that is sent by the station in the first local area network, and receive, by using the second channel, data that is sent by the station in the second local area network.

In other words, in this embodiment, after an AP sends, by using the first channel, the first beacon frame that includes system information of the first local area network, if a station (for example, a station 1) in the first local area network detects the first beacon frame, the station sends an access request to the AP by using the first channel, and if a station (for example, a station 2) in the second local area network detects the second beacon frame, the station sends an access request to the AP by using the second channel; next, the AP sends an access response to the station 1 by using the first channel, that is, the station 1 is connected to the network, and the AP sends an access response to the station 2 by using the second channel, that is, the station 2 is connected to the network; and next, the AP communicates with the station 1 and the station 2, for example, receives, by using the first channel, the data that is sent by the station in the first local area network, and receives, by using the second channel, the data that is sent by the station in the second local area network.

Optionally, in the foregoing embodiment, if the first channel and the second channel are channels with a bandwidth of 20 MHz, and the first channel and the second channel are consecutive, the receiving, by using the first channel, data that is sent by the station in the first local area network, and receiving, by using the second channel, data that is sent by the station in the second local area network is specifically: receiving, by using the first channel, data that is sent by a station with a bandwidth of 20 MHz in the first local area network, and receiving, by using the second channel, data that is sent by a station with a bandwidth of 20 MHz in the second local area network. For a specific implementation process thereof, refer to the foregoing corresponding embodiment. Details are not described herein again.

Optionally, in the foregoing embodiment, if the first channel and the second channel are channels with a bandwidth of 40 MHz or 80 MHz, and the first channel and the second channel are consecutive, the receiving, by using the first channel, data that is sent by the station in the first local area network, and receiving, by using the second channel, data that is sent by the station in the second local area network is specifically: receiving, by using the first channel, data that is sent by a station with a bandwidth of 40 MHz or 80 MHz in the first local area network, and receiving, by using the second channel, data that is sent by a station with a bandwidth of 40 MHz or 80 MHz in the second local area network. For a specific implementation process thereof, refer to the foregoing corresponding embodiment. Details are not described herein again.

Optionally, when the first local area network is an 802.11ac WLAN with a system bandwidth of 80 MHz or 160 MHz, the receiving, by using the first channel, data that is sent by the station in the first local area network, and receiving, by using the second channel, data that is sent by the station in the second local area network is specifically: receiving data only on a 40 MHz primary channel of the 80 MHz 11ac system or on an 80 MHz primary channel of the 160 MHz 11ac system; or receiving data only in a 40 MHz secondary system or on an 80 MHz secondary channel; or receiving data in an channel bandwidth of entire 80 MHz or 160 MHz.

Figure 13:
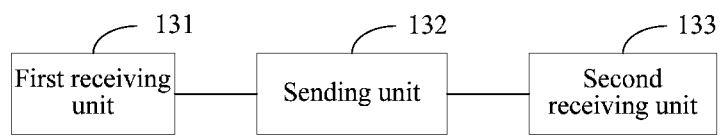
FIG. 13 is a schematic structural diagram of a data receiving apparatus according to an embodiment of the present invention.

Correspondingly, an embodiment of the present invention further provides a data receiving apparatus, of which a schematic structural diagram is shown in FIG. 13. The apparatus includes: a first receiving unit 131, a sending unit 132 and a second receiving unit 133, where the first receiving unit 131 is configured to receive a first access request that is sent by a station in a first local area network by using a first channel after a first beacon frame is detected, where the first channel and a second channel are consecutive channels of a wireless local area network, and the wireless local area network includes the first local area network and a second local area network, and receive a second access request that is sent by a station in the second local area network by using the second channel after a second beacon frame is detected; the sending unit 132 is configured to send a first access response to the station in the first local area network by using the first channel, and send a second access response to the station in the second local area network by using the second channel; and the second receiving unit 133 is configured to receive, by using the first channel, data that is sent by the station in the first local area network, and receive, by using the second channel, data that is sent by the station in the second local area network.

Optionally, the first channel and the second channel are channels with a bandwidth of 20 MHz, and the first channel and the second channel are consecutive; and that the second receiving unit receives, by using the first channel, data that is sent by the station in the first local area network, and receives, by using the second channel, data that is sent by the station in the second local area network is specifically that data that is sent by a station with a bandwidth of 20 MHz in the first local area network is received by using the first channel, and data that is sent by a station with a bandwidth of 20 MHz in the second local area network is received by using the second channel.

Optionally, the first channel and the second channel are channels with a bandwidth of 40 MHz or 80 MHz, and the first channel and the second channel are consecutive; and that the second receiving unit receives, by using the first channel, data that is sent by the station in the first local area network, and receives, by using the second channel, data that is sent by the station in the second local area network is specifically that data that is sent by a station with a bandwidth of 40 MHz or 80 MHz in the first local area network is received by using the first channel, and data that is sent by a station with a bandwidth of 40 MHz or 80 MHz in the second local area network is received by using the second channel.

Optionally, when the first local area network is an 802.11ac WLAN with a system bandwidth of 80 MHz or 160 MHz, that the second receiving unit receives, by using the first channel, data that is sent by the station in the first local area network, and receives, by using the second channel, data that is sent by the station in the second local area network is specifically that data only on a 40 MHz primary channel of an 80 MHz 11ac system or on an 80 MHz primary channel of a 160 MHz 11ac system is received; or data only in a 40 MHz secondary system or on an 80 MHz secondary channel is received; or data in an channel bandwidth of entire 80 MHz or 160 MHz is received.

For an implementation process of functions and effects of the units in the apparatus, refer to the specific implementation process of the foregoing embodiment. Details are not described herein again.

It should be noted that relational terms in this specification such as first and second are merely used to distinguish an entity or operation from another entity or operation, and do not necessarily require or imply that any actual relationship or sequence exists between these entities or operations. Moreover, the terms "include", "comprise", and any variant thereof are intended to cover a non-exclusive inclusion so that a process, a method, an article, or a device that includes a list of elements not only includes those elements, but also includes other elements that are not expressly listed, or further includes elements inherent to such a process, method, article, or device. An element proceeded by "include a/an . . . " does not, without more constraints, preclude the presence of additional identical elements in the process, method, article, or device that includes the element.

Based on the foregoing descriptions of the embodiments, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The foregoing descriptions are merely exemplary implementation manners of the present invention. It should be noted that a person of ordinary skill in the art may make several improvements and polishing without departing from the principle of the present invention and the improvements and polishing shall fall within the protection scope of the present invention.

What is claimed is:

1. A communication method in a wireless local area network (WLAN) comprising:
 determining, by a communications apparatus, a first channel and a second channel of the WLAN such that stations in the WLAN see the first and second channels as first and second local area networks, respectively, where a bandwidth of the WLAN is divided between the first and second channels such that the first local area network includes the first channel as a primary channel and the second channel as a secondary channel;

sending, by the communications apparatus, a first beacon frame using all or a part of a bandwidth of the first channel, wherein the first beacon frame comprises system information of the first local area network describing protocol information for communications over the first local area network, wherein (a) when the first and second channels have a bandwidth of 40 MHz, the system information of the first local area network comprises information indicating that the first local area network is an 802.11ac WLAN with a system bandwidth of 80 MHz and the second channel is a 40 MHz secondary channel of the 802.11ac WLAN and (b) when the first and second channels have a bandwidth of 80 MHz, the system information comprises information indicating that the first local area network is an 802.11ac WLAN with a system bandwidth of 160 MHz and the second channel is an 80 MHz secondary channel of the 802.11ac WLAN;

sending, by the communications apparatus, a second beacon frame using all or a part of a bandwidth of the second channel, wherein the second beacon frame comprises system information of the second local area network describing protocol information for communications over the second local area network, wherein (a) when the first and second channels have a bandwidth of 40 MHz the system information of the second local area network comprises at least one of the following: (i) information indicating that the second local area network is an 802.11a, 802.11b, 802.11g, 802.11n or 802.11ac WLAN with a system bandwidth of 20 MHz, and (ii) information indicating that the second local area network is an 802.11n or 802.11ac WLAN with a system bandwidth of the second channel 40 MHz; and (b) when the first and second channels have a bandwidth of 80 MHz, the system information of the second local area network comprises at least one of the following: (i) information indicating that the second local area network is an 802.11a, 802.11b, 802.11g, 802.11n or 802.11ac WLAN with a system bandwidth of 20 MHz, (ii) information indicating that the second local area network is an 802.11n or 802.11ac WLAN with a system bandwidth of the second channel 40 MHz, and (iii) information indicating that the second local area network is an 802.11ac WLAN with a system bandwidth of the second channel 80 MHz; and coordinating, by the communications apparatus, communications over the first and second local area networks to prevent interference between the channels and to provide a bandwidth of both the first and second channels to the first local area network depending on circumstances of communications over the first and second local area networks.

2. The method according to claim 1, wherein the sent first beacon frame and second beacon frame do not overlap in time.

3. The method according to claim 1, wherein the sent first beacon frame and second beacon frame overlap in time; and
when the sent first beacon frame and second beacon frame overlap in time, orthogonal frequency division multiplexing (OFDM) symbols of parts which overlap in time in the first beacon frame and the second beacon frame are aligned.

4. The method according to claim 1, wherein the first channel and the second channel are channels with a bandwidth of 20 MHz; and
wherein the system information of the first local area network comprises at least:
information indicating that the first local area network is an 802.11n WLAN with a system bandwidth of 40 MHz, and information indicating that the second channel is a secondary channel of the 802.11n WLAN; and
wherein the system information of the second local area network comprises:
information indicating that the second local area network is an 802.11a, 802.11b, 802.11g or 802.11n WLAN with a system bandwidth of 20 MHz.

5. The method according to claim 4, wherein the method further comprises:
sending, by using all or a part of the bandwidth of the first channel, a first data frame to a station connected to the first local area network; and
sending, by using all or a part of the bandwidth of the second channel, a second data frame to a station connected to the second local area network, wherein
when the sent first data frame and second data frame overlap in time, orthogonal frequency division multiplexing (OFDM) symbols of parts overlapping in time are aligned.

6. The method according to claim 1, wherein after determining the first channel and the second channel of the WLAN, the method further comprises:
dividing a communication time into multiple consecutive time segments, wherein
in each of the time segments, a station in at least one local area network of the first local area network and the second local area network is instructed not to compete for rights to use an operating channel of the at least one local area network to which the station belongs.

7. The method according to claim 6, wherein instructing the station comprises:
in each time segment, sending a frame on the operating channel of the at least one local area network, wherein a time length is set in a frame header of the frame, and the time length covers each of the time segments.

8. The method according to claim 7, wherein the frame sent on the operating channel of the at least one local area network is a clear to send-to-self (CTS-to-self) frame.

9. A communications apparatus in a wireless local area network (WLAN) comprising:
a processor; and
a memory which is coupled with the processor, wherein the memory contains computer-executable instructions which when executed by the processor causes the processor to implement operations including:
determining a first channel and a second channel of the WLAN such that stations in the WLAN see the first and second channels as first and second local area networks, respectively, where a bandwidth of the WLAN is divided between the first and second channels such that the first local area network includes the first channel as a primary channel and the second channel as a secondary channel;
sending a first beacon frame through a bandwidth of the first channel, wherein the first beacon frame comprises system information of the first local area network describing protocol information for communications over the first local area network;
sending a second beacon frame through a bandwidth of the second channel, wherein the second beacon frame comprises system information of the second local area network describing protocol information for communications over the second local area network; and coordinating, communications over the first and second local area networks to prevent interference between the channels and to provide a bandwidth of both the first and second channels to the first local area network depending on circumstances of communications over the first and second local area networks;

wherein when the first and second channels are determined to be channels with a bandwidth of 40 MHz, the operations further include:

sending the first beacon frame using a part of the bandwidth of the first channel, wherein the first beacon frame comprises the system information of the first local area network, which comprises: information indicating that the first local area network is an 802.11ac WLAN with a system bandwidth of 80 MHz, and information indicating that the second channel is a 40 MHz secondary channel of the 802.11ac WLAN; and sending the second beacon frame using a part of the bandwidth of the second channel, wherein the second beacon frame comprises the system information of the second local area network, and the system information of the second local area network comprises at least one of the following: (a) information indicating that the second local area network is an 802.11a, 802.11b, 802.11g, 802.11n or 802.11ac WLAN with a system bandwidth of 20 MHz, and (b) information indicating that the second local area network is an 802.11n or 802.11ac WLAN with a system bandwidth of the second channel 40 MHz; and wherein when the first and second channels are determined to be channels with a bandwidth of 80 MHz, the operations further include:

sending the first beacon frame using a part of the bandwidth of the first channel, where the first beacon frame comprises the system information of the first local area network, which comprises information indicating that the first local area network is an 802.11ac WLAN with a system bandwidth of 160 MHz, and information indicating that the second channel is an 80 MHz secondary channel of the 802.11ac WLAN; and sending the second beacon frame using a part of the bandwidth of the second channel, where the second beacon frame comprises the system information of the second local area network, which comprises at least one of the following: (a) information indicating that the second local area network is an 802.11a, 802.11b, 802.11g, 802.11n or 802.11ac WLAN with a system bandwidth of 20 MHz, (b) information indicating that the second local area network is an 802.11n or 802.11ac WLAN with a system bandwidth of the second channel 40 MHz, and (c) information indicating that the second local area network is an 802.11ac WLAN with a system bandwidth of the second channel 80 MHz.

10. The apparatus according to claim 9, wherein the first beacon frame and the second beacon frame do not overlap in time.

11. The apparatus according to claim 9, wherein the operations further include:

when the first beacon frame and the second beacon frame overlap in time, aligning orthogonal frequency division multiplexing (OFDM) symbols of parts which overlap in time in the first beacon frame and the second beacon frame.

12. The apparatus according to claim 9, wherein the first channel and the second channel that are determined to be channels with a bandwidth of 20 MHz; and the operations further include:

sending the first beacon frame using all of the bandwidth of the first channel, wherein the first beacon frame comprises the system information of the first local area network, which comprises: information indicating that the first local area network is an 802.11n WLAN with a system bandwidth of 40 MHz, and information indicating that the second channel is a secondary channel of the 802.11n WLAN; and sending the second beacon frame using all of the bandwidth of the second channel, wherein the second beacon frame comprises the system information of the second local area network, which comprises: information indicating that the second local area network is an 802.11a, 802.11b, 802.11g or 802.11n WLAN with a system bandwidth of 20 MHz.

13. The apparatus according to claim 12, wherein the operations further comprise:

sending, through at least a part of the bandwidth of the first channel, a first data frame to a station connected to the first local area network; and sending, through at least a part of the bandwidth of the second channel, a second data frame to a station connected to the second local area network.

14. The apparatus according to claim 13, wherein the operations further include:

when the first data frame and the second data frame overlap in time, aligning orthogonal frequency division multiplexing (OFDM) symbols of parts which overlap in time in the first data frame and the second data frame.

15. The apparatus according to claim 9, wherein the operations further include:

dividing a communication time into multiple consecutive time segments after the first channel and the second channel of the WLAN are determined; and instructing, in each of the divided time segments, a station in at least one local area network of the first local area network and the second local area network not to compete for rights to use an operating channel of the at least one local area network to which the station belongs.

16. The apparatus according to claim 15, wherein the operations further include: in each of the divided time segments, sending a frame on the operating channel of the at least one local area network, wherein a time length is set in a frame header of the frame, and the time length covers each of the time segments.

17. A communication method in a wireless local area network (WLAN) comprising:

receiving, by a data communication apparatus, a first access request that is sent by a station in a first local area network by using a first channel of the wireless local area network (WLAN) after detecting a first beacon frame describing protocol information for communications over the first local area network through the first channel;

receiving, by the data communication apparatus, a second access request that is sent by a station in a second local area network by using a second channel of the WLAN after detecting a second beacon frame describing protocol information for communications over the second local area network through the second channel,
   wherein the first channel and the second channel are determined such that stations in the WLAN see the first and second channels as the first and second local area networks, respectively, and communications are coordinated over the first and second local area networks to prevent interference between the channels and to provide a bandwidth of both the first and second channels to the first local area network depending on circumstances of communications over the first and second local area networks;
sending a first access response to the station in the first local area network using the first channel, and sending a second access response to the station in the second local area network using the second channel; and
receiving, by using the first channel, data that is sent by the station in the first local area network, and receiving, by using the second channel, data that is sent by the station in the second local area network;
wherein when the first and second channels have a bandwidth of 40 MHz or 80 MHz, using the first channel to receive data sent by the station in the first local area network and using the second channel to receive data sent by the station in the second local area network comprises receiving, by using the first channel, data that is sent by a station with a bandwidth of 40 MHz or 80 MHz in the first local area network, and receiving, by using the second channel, data that is sent by a station with a bandwidth of 40 MHz or 80 MHz in the second local area network; and
wherein when the first local area network is an 802.11ac WLAN with a system bandwidth of 80 MHz or 160 MHz, using the first channel to receive data sent by the station in the first local area network and using the second channel to receive data sent by the station in the second local area network comprises at least one of the following:
(a) receiving data on a 40 MHz primary channel of the 80 MHz 11ac system or on an 80 MHz primary channel of the 160 MHz 11ac system;
(b) receiving data in a 40 MHz secondary system or on an 80 MHz secondary channel; and
(c) receiving data in a channel bandwidth of entire 80 MHz or 160 MHz.

18. The method according to claim 17, wherein the first channel and the second channel are channels with a bandwidth of 20 MHz; and
   wherein receiving, by using the first channel, the data that is sent by the station in the first local area network, and receiving, by using the second channel, the data that is sent by the station in the second local area network comprise:
   receiving, by using the first channel, data that is sent by a station with a bandwidth of 20 MHz in the first local area network, and receiving, by using the second channel, data that is sent by a station with a bandwidth of 20 MHz in the second local area network.

19. A communications apparatus in a wireless local area network (WLAN) comprising:
   a processor; and
   a memory which is coupled with the processor, wherein the memory contains computer-executable instructions which when executed by the processor causes the processor to implement operations including:
   receiving a first access request that is sent by a station in a first local area network using a first channel of a wireless local area network (WLAN) after detection of a first beacon frame describing protocol information for communications over the first local area network through the first channel;
receiving a second access request that is sent by a station in a second local area network using a second channel of the WLAN after detection of a second beacon frame describing protocol information for communications over the second local area network through the second channel,
   wherein the first channel and the second channel are determined such that stations in the WLAN see the first and second channels as first and second local area networks, respectively, and communications are coordinated over the first and second local area networks to prevent interference between the channels and to provide a bandwidth of both the first and second channels to the first local area network depending on circumstances of communications over the first and second local area networks;
sending a first access response to the station in the first local area network using the first channel, and send a second access response to the station in the second local area network using the second channel; and
receiving, data that is sent by the station in the first local area network using the first channel, and receiving, data that is sent by the station in the second local area network using the second channel
wherein when the first and second channels have a bandwidth of 40 MHz, the operations further include:
   sending the first beacon frame using a part of the bandwidth of the first channel, wherein the first beacon frame comprises the system information of the first local area network, which comprises: information indicating that the first local area network is an 802.11ac WLAN with a system bandwidth of 80 MHz, and information indicating that the second channel is a 40 MHz secondary channel of the 802.11ac WLAN; and
   sending the second beacon frame using a part of the bandwidth of the second channel, wherein the second beacon frame comprises the system information of the second local area network, and the system information of the second local area network comprises at least one of the following: (a) information indicating that the second local area network is an 802.11a, 802.11b, 802.11g, 802.11n or 802.11ac WLAN with a system bandwidth of 20 MHz, and (b) information indicating that the second local area network is an 802.11n or 802.11ac WLAN with a system bandwidth of the second channel 40 MHz; and
wherein when the first and second channels are determined to be channels with a bandwidth of 80 MHz, the operations further include:
   sending the first beacon frame using a part of the bandwidth of the first channel, where the first beacon frame comprises the system information of the first local area network, which comprises information indicating that the first local area network is an 802.11ac WLAN with a system bandwidth of 160 MHz, and information indicating that the second channel is an 80 MHz secondary channel of the 802.11ac WLAN; and
   sending the second beacon frame using a part of the bandwidth of the second channel, where the second beacon frame comprises the system information of the second local area network, which comprises at least one of the following: (a) information indicating that the second local area network is an 802.11a, 802.11b, 802.11g, 802.11n or 802.11ac WLAN with a system bandwidth of 20 MHz, (b) information indicating that the second local area network is an 802.11n or 802.11ac WLAN with a system bandwidth of the second channel 40 MHz, and (c) information indicating that the second local area network is an 802.11ac WLAN with a system bandwidth of the second channel 80 MHz.

* * * * *